United States Patent [19]
Chen

[11] Patent Number: 5,852,956
[45] Date of Patent: Dec. 29, 1998

[54] BICYCLE PEDAL ASSEMBLY HAVING A ROTATABLE CLEAT ENGAGING UNIT MOUNTED THEREON

[76] Inventor: Chung-I Chen, No. 3, Kung-Chi Rd., Yu-Shih Industrial Dist., Ta-Chia Chen, Taichung Hsien, Taiwan

[21] Appl. No.: 837,243

[22] Filed: Apr. 10, 1997

[30] Foreign Application Priority Data

Feb. 1, 1997 [TW] Taiwan ................................. 86201818

[51] Int. Cl.⁶ ........................................................ G05G 1/14
[52] U.S. Cl. ............................... 74/594.6; 74/594.4
[58] Field of Search .......................... 74/594.4, 594.6; 36/131, 132

[56] References Cited

U.S. PATENT DOCUMENTS

| | | | |
|---|---|---|---|
| 5,203,229 | 4/1993 | Chen | 74/594.4 X |
| 5,685,202 | 11/1997 | Chen | 74/594.6 |
| 5,692,415 | 12/1997 | Lin | 74/594.6 |
| 5,697,262 | 12/1997 | Chen | 74/594.6 |

FOREIGN PATENT DOCUMENTS

| | | | |
|---|---|---|---|
| 0 619 219 A1 | 10/1994 | European Pat. Off. | 74/594.6 |
| 0 753 454 A1 | 1/1997 | European Pat. Off. | 74/594.6 |
| 2624470 | 6/1989 | France | 74/594.6 |
| 2699492 | 6/1994 | France | 74/594.6 |

*Primary Examiner*—Vinh T. Luong
*Attorney, Agent, or Firm*—Panitch Schwarze Jacobs & Nadel, P.C.

[57] ABSTRACT

A bicycle pedal assembly includes a pedal body, a coiled spring member and a pedal shaft. The pedal body has a frame portion and a tubular portion which partitions the frame portion. A cleat engaging unit is connected to the tubular portion. The coiled spring member interconnects the frame portion and an end of the tubular portion in order to position revertably the cleat engaging unit at a predetermined angle with respect to the frame portion. The pedal shaft extends through the coiled spring member and the tubular portion so that the frame portion is rotatable about the pedal shaft. The pedal shaft has a first end which extends beyond the frame portion and a second end which engages rotatably the tubular portion.

2 Claims, 5 Drawing Sheets

BICYCLE PEDAL ASSEMBLY HAVING A ROTATABLE CLEAT ENGAGING UNIT MOUNTED THEREON

BACKGROUND OF THE INVENTION

1. Field of the Invention

This invention relates to a bicycle pedal assembly, more particularly to a bicycle pedal assembly which has a rotatable cleat engaging unit mounted thereon.

2. Description of the Related Art

Referring to FIG. 1, a conventional bicycle pedal assembly is shown to comprise a pedal body 10 and a pedal shaft 14. The pedal body 10 includes a generally rectangular frame portion 11 and a tubular portion 13 which divides the frame portion 11 in a transverse direction, as best illustrated in FIG. 2. The tubular portion 13 has a cleat engaging unit 20 fixed thereon in order to engage a cycling shoe, thereby preventing untimely disengagement of the pedal assembly and the cycling shoe. The cleating unit 20 has a lower engaging member 21 which is fixed transversely to the tubular portion 13 and an upper engaging member 22 which is connected to the lower engaging member 21 by means of screw members 23. The pedal shaft 14 is journalled in the tubular portion 13 of the pedal body 10 and has an end connected to a crank arm (not shown) of a bicycle.

Since the cleat engaging unit 20 is fixed to the tubular portion 13 at a fixed angle relative to the frame portion 11, the cycling shoe is not allowed to swivel relative to the frame portion 11 during the pedal stroke. This is a shortcoming in case of long distance riding.

SUMMARY OF THE INVENTION

The object of the present invention is to provide a bicycle pedal assembly which can overcome the shortcoming that is commonly associated with the conventional bicycle pedal assembly.

According to the present invention, the bicycle pedal assembly comprises:

a pedal body including a frame portion and a tubular portion which partitions the frame portion in a transverse direction, the tubular portion having a cleat engaging unit fixed thereto;

a coiled spring member interconnecting the frame portion and an end of the tubular portion in order to position revertably the cleat engaging unit at a predetermined angle with respect to the frame portion of the pedal body; and a pedal shaft extending through the coiled spring member and the tubular portion so that the frame portion of the pedal body is rotatable about the pedal shaft, the pedal shaft having a first end which extends beyond the frame portion and a second end which engages rotatably the tubular portion.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
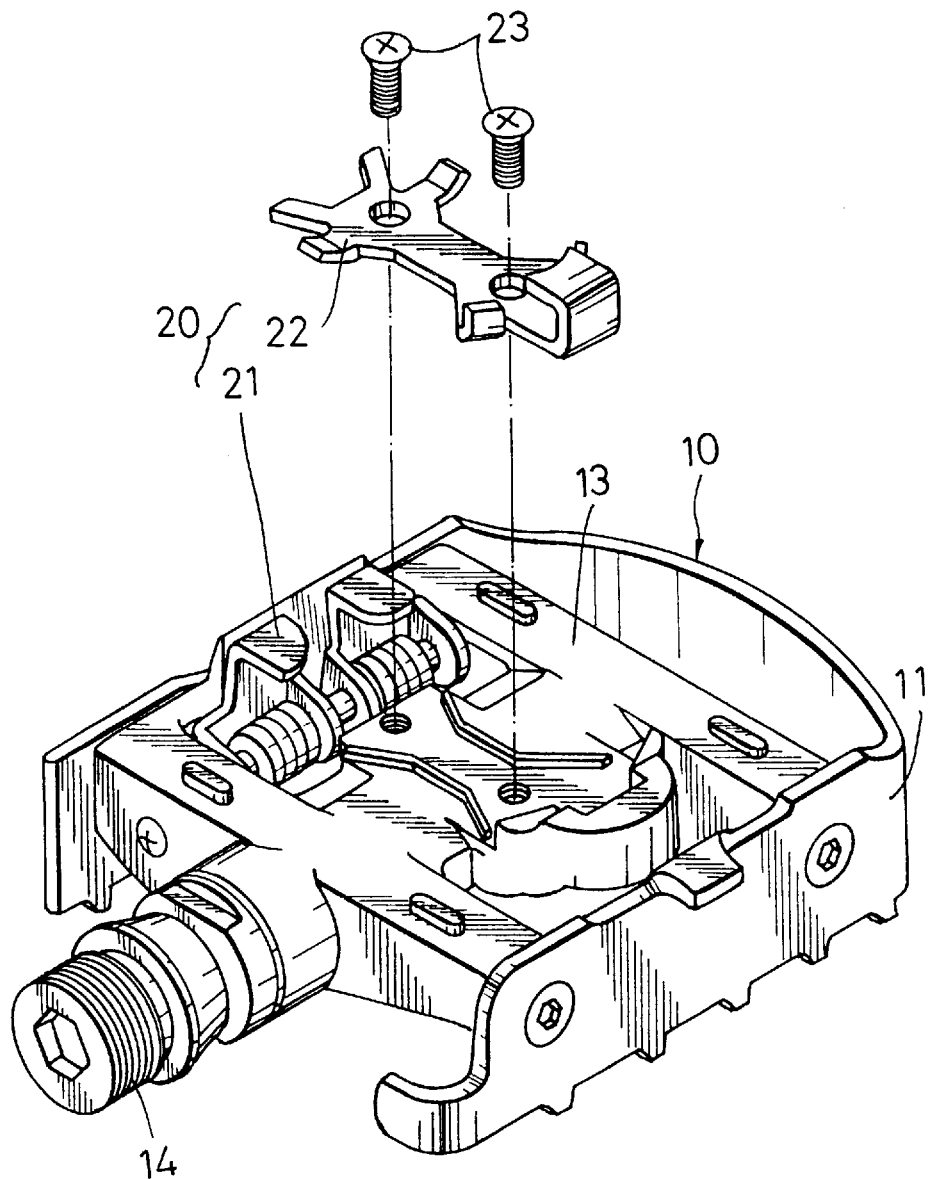
FIG. 1 is an exploded view of a conventional bicycle pedal assembly.
Figure 2:
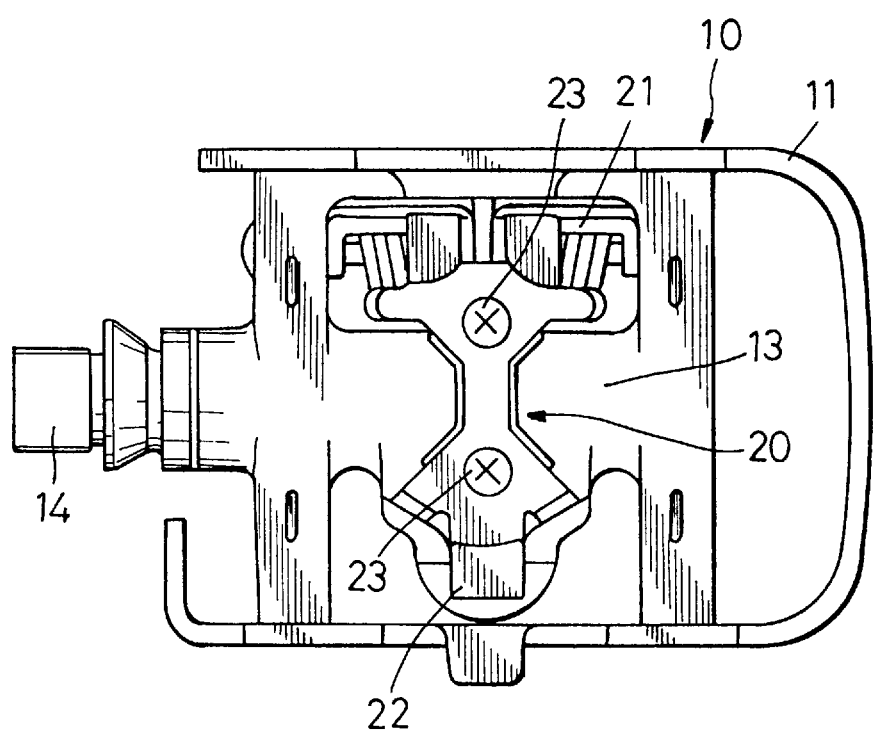
FIG. 2 is a top view of the conventional bicycle pedal assembly.
Figure 3:
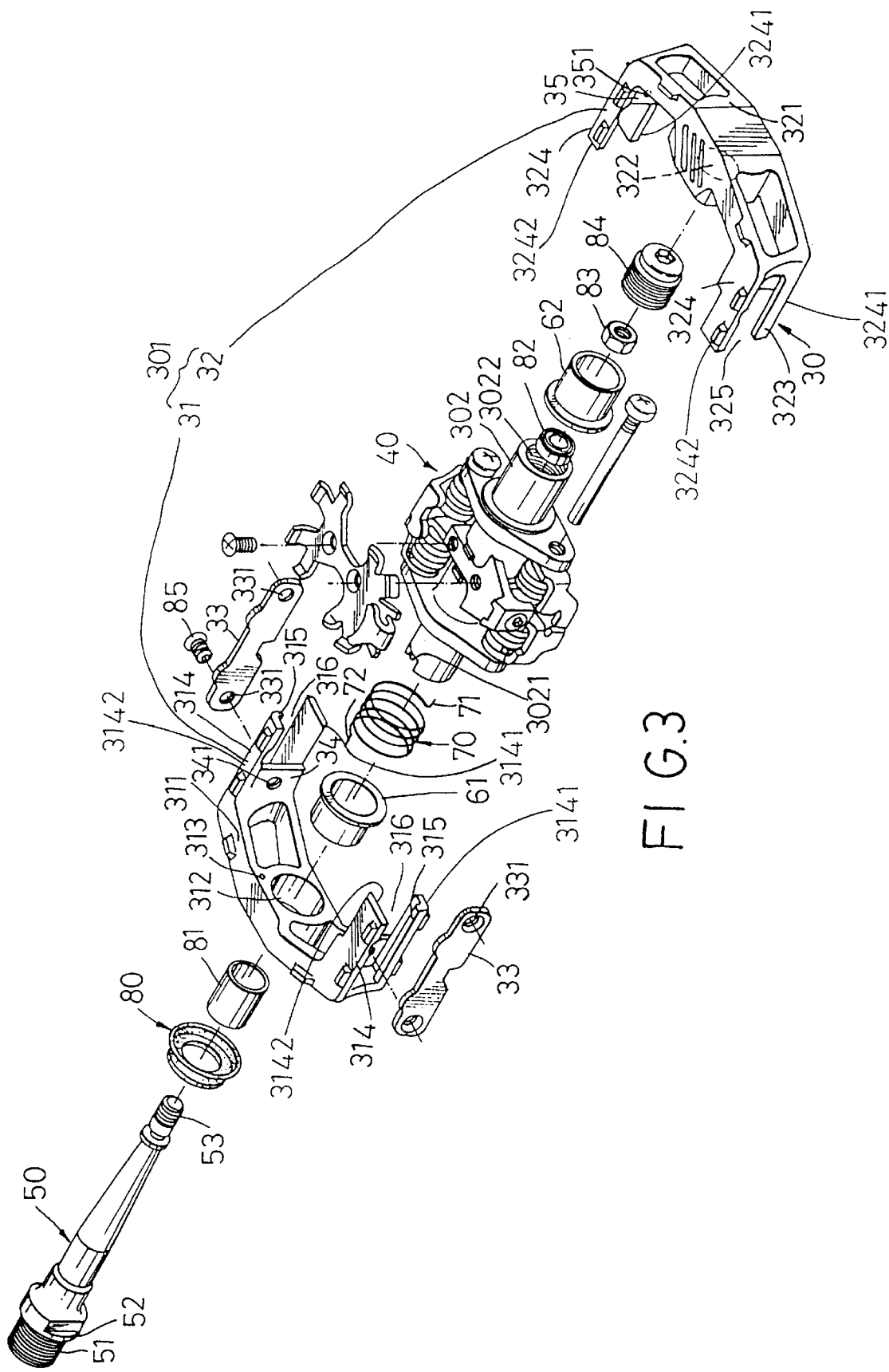
FIG. 3 is an exploded view of a preferred embodiment of a bicycle pedal assembly according to the present invention.
Figure 4:
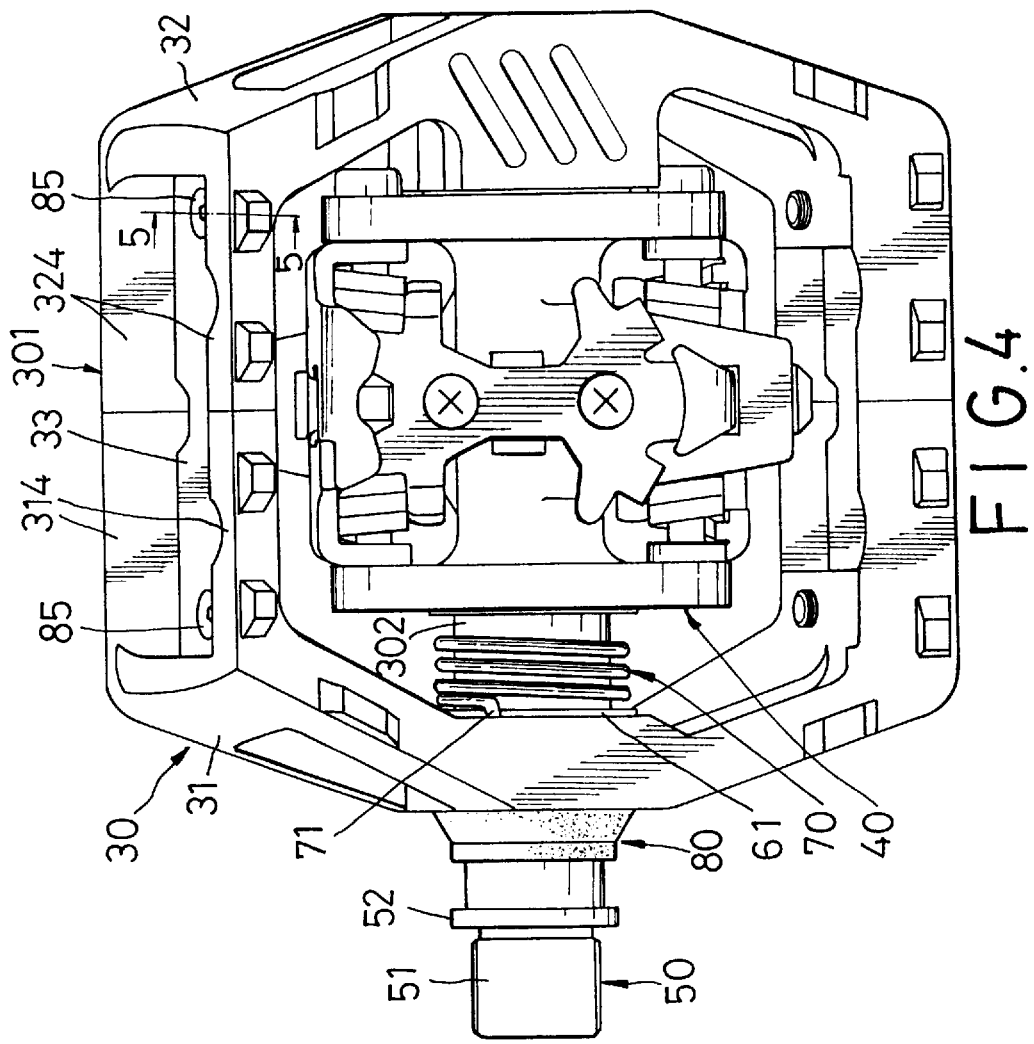
FIG. 4 is a top view of the preferred embodiment of the bicycle pedal assembly according to the present invention.

Referring to FIGS. 3 and 4, a preferred embodiment of a bicycle pedal assembly according to the present invention is shown to comprise a pedal body 30, a cleat engaging unit 40 and a pedal shaft 50.

Figure 5:
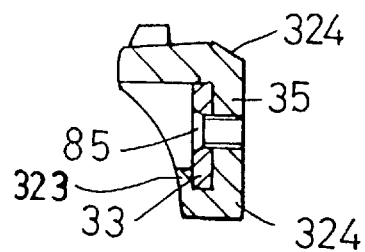
FIG. 5 is a cross sectional view of the preferred embodiment, taken along lines 5—5 of FIG. 4.

The pedal body 30 includes a frame portion 301 and a tubular portion 302 with first and second ends 3021, 3022 which partitions the frame portion 301 in a transverse direction. The frame portion 301 has first and second U-shaped members 31, 32 and a pair of connecting plates 33. Each of the first and second U-shaped members 31, 32 has two arm portions 314, 324. Each of the arm portions 314, 324 of the first and second U-shaped members 31, 32 includes a spaced pair of parallel plate members 3141, 3142, 3241, 3242 and an engaging plate 34, 35 which interconnects transversely the parallel plate members. A receiving space 316, 325 is formed between the parallel plate members of each of the arm portions 314, 324. Each of the connecting members 33 is received in the receiving space 316, 325 of a respective one of the arm portions 314, 324 of the first and second U-shaped members 31, 32 and interconnect detachably the respective one of the engaging plates 34, 35 of the first and second U-shaped members 31, 32 by engaging screw members 85 and threaded holes 341 and 351 formed in the engaging plates 34 and 35, respectively, as best illustrated in Figures and 5. One of the parallel plate members of each of the arm portions 314, 324 has an abutting wall 315, 323 which is formed along an outer edge thereof and which abuts against an external face of a corresponding one of the connecting plates 33, as best illustrated in FIGS. 3 and 5. As such, the first and second U-shaped members 31, 32 are connected to one another in order to form a rectangular frame structure.

The cleat engaging unit 40 is fixed to the tubular portion 302 in a manner similar to that in the aforementioned prior art. Since the structure of the cleat engaging member 40 is similar to that of the cleat engaging unit 20 in the prior art and since said structure is not the feature of the present invention, the cleat engaging unit 40 will not be detailed hereinbelow for the shake of brevity.

Each of the first and second U-shaped members 31, 32 has a base portion 311, 321 which interconnects the arms portions 314, 324 thereof. The base portion 311 of the first arm 31 has a central through hole 312 formed therein, a first bush member 61 fitted into the central through hole 312, a collar 81 received in the first bush member 61, and a rubber sealing ring 80 which engages one end of the first bush member 61 and which abuts against the base portion 311 of the first U-shaped member 31. The base portion 321 of the second U-shaped member 32 has a central cavity 322 formed therein and a second bush member 62 which is fitted in the central cavity 322 and which is sleeved onto the second end 3022 of the tubular portion 302. The second end 3022 of the tubular portion 302 has a cap member 84 with an external thread which engages an internal thread formed in the second end 3022 of the tubular portion 302 in order to close the second end 3022.

The pedal shaft 50 extends through the sealing ring 80, the collar 81 in the first bush member 61 and a bearing 82 which is mounted in the tubular portion 302 so that the frame portion 301 of the pedal body 30 is rotatable about the pedal shaft 50.

The pedal shaft 50 has a first end 51, which extends beyond the frame portion 301 and which is formed integrally with a radial ring 52, and a second end 53. The second end 53 of the pedal shaft 50 is formed with a threaded portion which extends into the cap member 84 and has a nut 83 which engages the threaded portion and which is received rotatably in the cap member 84. Therefore, the second end 53 of the pedal shaft 50 can be supported rotatably in the second end 3022 of the tubular portion 302.

Figure 6:
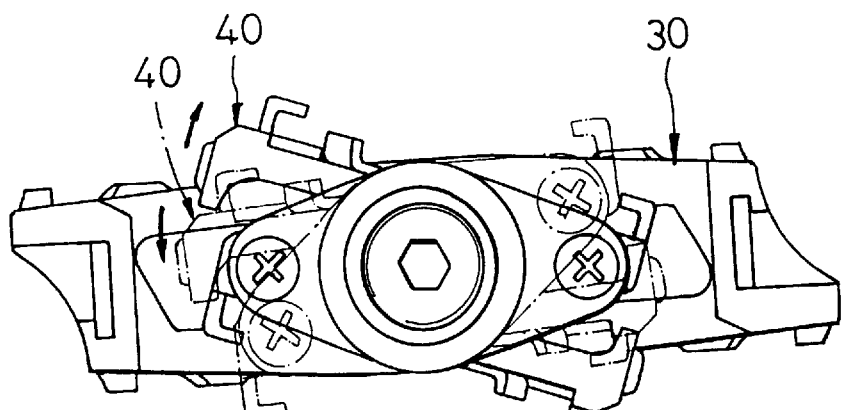
FIG. 6 is a schematic side view illustrating how a cleat engaging unit is rotated at an angle relative to a pedal body of the bicycle pedal assembly according to the present invention.

A coiled spring member 70 interconnects a hole 313 formed in the base portion 311 of the first U-shaped member 31 and the first end 3021 of the tubular portion 302 at two ends 71 of the coiled spring member 70 in order to position revertably the cleat engaging unit 40 at a predetermined angle with respect to the frame portion 301 of the pedal body 30. In this embodiment, the cleat engaging unit 40 may be rotated upward by an angle of 20 degrees and downward by an angle of 10 degrees relative to a plane defined by the frame portion 301 of the pedal body 30 against the biasing force of the coiled spring member 70, as best illustrated in FIG. 6, thereby providing comfort to the user's feet during long distance riding.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A bicycle pedal assembly comprising:

a pedal body including a rectangular frame portion and a tubular portion with first and second ends which partition said frame portion in a transverse direction, said tubular portion having a cleat engaging unit fixed thereto;

a coil spring member interconnecting said frame portion and said first end of said tubular portion to position revertably said cleat engaging unit at a predetermined angle with respect to said frame portion of said pedal body; and a pedal shaft extending through said coil spring member and said tubular portion so that said frame portion of said pedal body is rotatable about said pedal shaft, said pedal shaft having a first end which extends beyond said frame portion and a second end which engages rotatably said tubular portion adjacent to said second end of said tubular portion, wherein said frame portion has first and second U-shaped members and a pair of connecting plates, each of said first and second U-shaped members having two arm portions, said arm portions of said first and second U-shaped members being connected detachably to one another by said connecting plates, and wherein said tubular portion has a bearing mounted therein, said pedal shaft extending through said bearing in said tubular portion, each of said first and second U-shaped members having a base portion which interconnects said arms portions thereof, said base portion of said first arm having a central through hole formed therein, a first bush member fitted into said central through hole, a collar received in said first bush member and a rubber sealing ring which engages one end of said first bush member and which abuts against said base portion of said first U-shaped member, said base portion of said second U-shaped member having a central cavity formed therein and a second bush member which is fitted in said central cavity and which is sleeved onto the second end of said tubular portion, said second end of said tubular portion having a cap member connected thereto in order to close said tubular portion, said pedal shaft extending through said sealing ring and said collar in said first bush member and having a threaded portion which is formed at said second end of said pedal shaft and a nut which engages said threaded portion and which is received rotatably in said cap member.

2. bicycle pedal assembly comprising:

a pedal body including a rectangular frame portion and a tubular portion with first and second ends which partition said frame portion in a transverse direction, said tubular portion having a cleat engaging unit fixed thereto;

a coil spring member interconnecting said frame portion and said first end of said tubular portion to position revertably said cleat engaging unit at a predetermined angle with respect to said frame portion of said pedal body; and a pedal shaft extending through said coil spring member and said tubular portion so that said frame portion of said pedal body is rotatable about said pedal shaft, said pedal shaft having a first end which extends beyond said frame portion and a second end which engages rotatably said tubular portion adjacent to said second end of said tubular portion, wherein said frame portion has first and second U-shaped members and a pair of connecting plates, each of said first and second U-shaped members having two arm portions, said arm portions of said first and second U-shaped members being connected detachably to one another by said connecting plates, and wherein each of said arm portions of said first and second U-shaped members includes a spaced pair of parallel plate members and a receiving space formed between said pair of parallel plate members to receive a corresponding one said connecting plates, one of said parallel plate members of each of said arm portions having an abutting wall which is formed along an outer edge thereof and which abuts against an external face of said corresponding one of said connecting plates.

* * * * *